United States Patent
Haukås et al.

(10) Patent No.: US 11,263,801 B2
(45) Date of Patent: Mar. 1, 2022

(54) SMOOTH SURFACE WRAPPING OF FEATURES IN AN IMAGED VOLUME

(71) Applicant: SCHLUMBERGER TECHNOLOGY CORPORATION, Sugar Land, TX (US)

(72) Inventors: Jarle Haukås, Sola (NO); Aicha Bounaim, Hafrsfjord (NO); Oddgeir Gramstad, Stavanger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 46 days.

(21) Appl. No.: 16/499,400

(22) PCT Filed: Apr. 2, 2018

(86) PCT No.: PCT/US2018/025624
§ 371 (c)(1),
(2) Date: Sep. 30, 2019

(87) PCT Pub. No.: WO2018/183992
PCT Pub. Date: Oct. 4, 2018

(65) Prior Publication Data
US 2021/0097751 A1 Apr. 1, 2021

Related U.S. Application Data

(60) Provisional application No. 62/479,577, filed on Mar. 31, 2017.

(51) Int. Cl.
*G06T 15/08* (2011.01)
*G06T 7/10* (2017.01)
*G06K 9/00* (2006.01)

(52) U.S. Cl.
CPC ............ *G06T 15/08* (2013.01); *G06K 9/0063* (2013.01); *G06T 7/10* (2017.01)

(58) Field of Classification Search
CPC .......... G06T 15/08; G06T 7/10; G06K 9/0063
See application file for complete search history.

(56) References Cited

U.S. PATENT DOCUMENTS

| 2,915,310 A | 12/1959 | Gibson, Jr. |
| 3,776,032 A | 12/1973 | Vogel |
| (Continued) | | |

FOREIGN PATENT DOCUMENTS

| CA | 2659925 A1 | 9/2009 |
| WO | 9627141 A1 | 9/1996 |
| (Continued) | | |

OTHER PUBLICATIONS

Zhang, Q., Chang, I. and Li, L., 2009. Salt interpretation for depth imaging—where geology is working in the geophysical world. In SEG Technical Program Expanded Abstracts 2009 (pp. 3660-3664). Society of Exploration Geophysicists.*

(Continued)

*Primary Examiner* — Zhitong Chen

(57) ABSTRACT

The present disclosure provides an automated interpretation workflow for smooth surface wrapping of an imaged volume. The methods use a volume attribute to classify data into regions corresponding to feature/uncertain/non-feature parts and use smoothing through the uncertain parts to connect the clear boundaries of the feature. Any volume attribute can be used as long as feature/uncertain/non-feature categories can be identified in terms of continuous or discontinuous threshold values or ranges. The workflow can be combined with interpretation of well-defined boundary parts to resolve uncertainty and can be used with both explicit single-z and implicit multi-z (level set) boundary representations.

13 Claims, 12 Drawing Sheets

(56) References Cited

U.S. PATENT DOCUMENTS

| | | |
|---|---|---|
| 5,226,019 A | 7/1993 | Bahorich |
| 5,710,726 A | 1/1998 | Rowney et al. |
| 5,724,309 A | 3/1998 | Higgs et al. |
| 6,092,074 A | 7/2000 | Rodkin et al. |
| 6,480,230 B1 | 11/2002 | Honma |
| 6,574,563 B1 | 6/2003 | Nickel |
| 6,694,264 B2 | 2/2004 | Grace |
| 6,819,111 B2 | 11/2004 | Fanini et al. |
| 6,915,310 B2 | 7/2005 | Gutierrez et al. |
| 7,003,439 B2 | 2/2006 | Aldred et al. |
| 7,184,991 B1 | 2/2007 | Wentland et al. |
| 7,203,342 B2 | 4/2007 | Pedersen |
| 7,248,539 B2 | 7/2007 | Borgos et al. |
| 7,355,597 B2 | 4/2008 | Laidlaw et al. |
| 7,391,675 B2 | 6/2008 | Drew |
| 7,426,331 B2 | 9/2008 | Faisy |
| 7,606,581 B2 | 10/2009 | Riise et al. |
| 7,606,582 B2 | 10/2009 | Riise et al. |
| 7,616,964 B2 | 11/2009 | Riise et al. |
| 7,680,640 B2 | 3/2010 | Camilleri |
| 7,848,764 B2 | 12/2010 | Riise et al. |
| 7,853,270 B2 | 12/2010 | Riise et al. |
| 7,859,943 B2 | 12/2010 | Herwanger |
| 7,880,640 B2 | 2/2011 | Lovell et al. |
| 8,050,689 B2 | 11/2011 | Riise et al. |
| 8,392,163 B2 | 3/2013 | Liu |
| 8,743,115 B1 | 6/2014 | Mallet et al. |
| 9,341,728 B2 | 5/2016 | Bounaim et al. |
| 9,594,174 B2 | 3/2017 | Goujon et al. |
| 10,481,297 B2 | 11/2019 | Ravndal et al. |
| 2002/0126896 A1 | 9/2002 | Pedersen |
| 2003/0023383 A1 | 1/2003 | Stark |
| 2003/0112704 A1 | 6/2003 | Goff et al. |
| 2003/0234781 A1 | 12/2003 | Laidlaw et al. |
| 2004/0100263 A1 | 5/2004 | Fanini et al. |
| 2004/0260476 A1 | 12/2004 | Borgos et al. |
| 2005/0120013 A1 | 6/2005 | Chang et al. |
| 2005/0171700 A1 | 8/2005 | Dean |
| 2006/0062084 A1 | 3/2006 | Drew |
| 2007/0027666 A1 | 2/2007 | Frankel |
| 2007/0135991 A1 | 6/2007 | Riise et al. |
| 2007/0135993 A1 | 6/2007 | Riise et al. |
| 2007/0146374 A1 | 6/2007 | Riise et al. |
| 2007/0150199 A1 | 6/2007 | Riise et al. |
| 2008/0033656 A1 | 2/2008 | Herwanger |
| 2008/0154505 A1 | 6/2008 | Kim et al. |
| 2008/0249414 A1 | 10/2008 | Yang et al. |
| 2008/0285384 A1 | 11/2008 | James |
| 2009/0119255 A1 | 5/2009 | Frank et al. |
| 2009/0299710 A1 | 12/2009 | Liu |
| 2010/0029299 A1 | 2/2010 | Riise et al. |
| 2010/0030646 A1 | 2/2010 | Riise et al. |
| 2010/0115149 A1 | 5/2010 | Ewer |
| 2010/0121623 A1 | 5/2010 | Yogeswaren |
| 2010/0161232 A1 | 6/2010 | Chen et al. |
| 2010/0252270 A1 | 10/2010 | Kim et al. |
| 2011/0016507 A1 | 1/2011 | Becker |
| 2011/0046885 A1 | 2/2011 | Bussat et al. |
| 2011/0063292 A1 | 3/2011 | Holl et al. |
| 2011/0106507 A1 | 5/2011 | Lepage |
| 2011/0205844 A1 | 8/2011 | Maucec et al. |
| 2011/0295510 A1 | 12/2011 | Gulati |
| 2012/0029828 A1 | 2/2012 | Pepper et al. |
| 2012/0044784 A1 | 2/2012 | Pierle |
| 2012/0044785 A1 | 2/2012 | Yoda et al. |
| 2012/0139542 A1 | 6/2012 | Montgomery et al. |
| 2013/0054147 A1 | 2/2013 | Diller |
| 2013/0090857 A1 | 4/2013 | Imhof et al. |
| 2013/0158877 A1 | 6/2013 | Bakke et al. |
| 2013/0238297 A1 | 9/2013 | Lepage et al. |
| 2014/0214328 A1* | 7/2014 | Haukås et al. ......... G01V 1/302 702/16 |
| 2014/0278115 A1* | 9/2014 | Bas ..................... G01V 99/005 702/14 |
| 2014/0341345 A1 | 11/2014 | Morton |
| 2016/0139299 A1* | 5/2016 | Leger ..................... E02B 1/02 703/2 |

FOREIGN PATENT DOCUMENTS

| | | |
|---|---|---|
| WO | 9837437 A1 | 8/1998 |
| WO | 2008086352 A1 | 7/2008 |
| WO | 2011149609 A1 | 12/2011 |
| WO | 2013108221 A1 | 7/2013 |
| WO | 2014117115 A1 | 7/2014 |

OTHER PUBLICATIONS

Adalsteinsson, D. et al., "A Fast Level Set Method for Propagating Interfaces", Journal of Computational Physics, 1995, vol. 118, pp. 269-277.

Berthelot, A. et al., "Salt diapirs without well defined boundaries—a feasibility study of semi-automatic detection", Geophysical Prospecting, 2011, vol. 59, pp. 682-696.

Bhalerao, A. et al., "Tensor Splats Visualising Tensor Fields by Texture Mapped Volume Rendering", MICCAI 2003, LNCS 2879, pp. 294-302.

Castagna, J. P. et al., "Principles of AVO crossplotting", The Leading Edge, Apr. 1997, 6 pages.

Caviedes, S. M. et al., "User Interfaces to Interact with Tensor Fields. A State-of-the-Art Analysis", Similar NoE Tensor Workshop, Las Palmas, Nov. 2006, 36 pages.

Chopp, D. L., "Computing Minimal Surfaces via Level Set Curvature Flow", Journal of Computational Physics, 1993, vol. 106, pp. 77-91.

Connolly, D. L. et al., "Detecting Fault-Related Hydrocarbon Migration Pathways in Seismic Data: Implications for Fault-Seal, Pressure, and Charge Prediction", Gulf Coast Association of Geological Societies Transactions, 2008, vol. 58, pp. 191-203.

Daly, C. et al., "Characterisation and Modelling of Fractured Reservoirs: Static Model", Proceedings of the EP Conference of Mathematics of Oil Recovery, Aug. 30, 2004, P008072917, 8 pages.

Ferguson, C. J. et al., "Seismic analysis workflow for reservoir characterization in the vicinity of salt", First Break, Oct. 2010, vol. 28, pp. 107-113.

Guillen, P., "Supervised learning to detect salt body", 2015 SEG's International Exposition and 85th Annual Meeting in New Orleans, LA, U.S.A., pp. 1826-1828.

Heggeland, R. et al., "The chimney cube, an example of semi-automated detection of seismic object by directive attributes and neural networks: Part II; Interpretation", SEG Expanded Abstracts 18, 1999, 4 pages.

Iske, A. et al., "Mathematical Methods and Modelling in Hydrocarbon Exploration and Production", Springer: Heidelberg, 2005, pp. 47-116 and 247-265.

Kadlec, B. J. et al., "Interactive Visualization and interpretation of Geologic Surfaces in 3-D Seismic Data", SEG Houston International Exposition and Annual Meeting, 2009, pp. 1147-1151.

Kindlmann, G. et al., "Strategies for Direct Volume Rendering of Diffusion Tensor Fields", 2000 IEEE Transactions On Visualization and Computer Graphics, 6(2), pp. 124-138.

Lomask, J. et al., "Application of image segmentation to tracking 3D salt boundaries", Geophysics, Jul.-Aug. 2007, vol. 72(4), pp. P47-P56.

McInerney, T. et al., "Deformable models in medical image analysis: a survey", Medical Image Analysis, 1996, vol. 1(2), pp. 91-108.

Meldahl P. et al., "The chimney cube, an example of semi-automated detection of seismic objects by directive attributes and neural networks: Part 1; Methodology", SEG Expanded Abstracts 18, 1999, 4 pages.

Nickel, M. et al., "Non-rigid matching of migrated time-lapse seismic", 61st EAGE Conference & Exhibition P065 SEG Expanded Abstracts, 1999, pp. 1-4.

(56) References Cited

OTHER PUBLICATIONS

Nickel, M. et al., "Well Performance Analysis using 4D Seismic", SEG Houston International Exposition and Annual Meeting, 2009, pp. 3795-3799.
Nielsen, M. B. et al., "Dynamic Tubular Grid: An Efficient Data Structure and Alogrithms for High Resolution Level Sets", Journal of Scientific Computing 26, 2006, No. 3, pp. 261-299.
Nyamapfumba, M. et al., "Gas hydrate and free gas petroleum system in 3D seismic data, offshore Angola", Geophysics, 2012, vol. 77(6), pp. O55-O63.
Pederson, S. I. et al., Automatic Fault Extraction using Artificial Ants, SEG International Exposition and 72nd Annual Meeting, Oct. 2002, pp. 1-4.
PetroMod Modules—Software Modules at a Glance, Schlumberger, 2012, 12-S-0398, 2 pages.
Randen, T. et al., "Chapter 2: Atlas of 3D Seismic Attributes", in Mathematical Methods and Modelling in Hydrocarbon Exploration and Production, Springer: Heidelberg, Ed.: Iske et al., 2005, pp. 23-46.
Sethian, J. A. "Level Set Methods and Fast Marching Methods", Cambridge University Press: Cambridge, 1999 Edition, pp. 60-85 and 214-239.
Veeken, P. et al., "AVO attribute analysis and seismic reservoir characterization", First Break, Feb. 2006, vol. 1, pp. 41-52.
Whitaker, R., "The Visualization Handbook", 6 Isosurface and Level-Sets, May 19, 2004, pp. 91-118.
Xu, C. et al., "On the Relationship between Parametric and Geometric Active Contours", IEEE Proceedings of the 34th Asilomar Conference on Signals, Systems and Computers, 2000, pp. 483-489.
Zhang, Q. et al., "Salt interpretation for depth imaging—where geology is working in the geophysical world", SEG Houston 2009 International Exposition and Annual Meeting, pp. 3660-3664.
Zheng, X. et al., "Topological Lines in 3D Tensor Fields", IEEE Visualization, 2004, pp. 313-320.
Bakker, P. et al., "Confidence and curvature estimation of curvilinear structures in 3-D", Proceedings Eighth IEEE International Conference on Computer Vision, Jul. 2001, Vancouver, BC, Canada, 6 pages.
Jeong, W-K. et al., "Interactive 3D seismic fault on the Graphics Hardware", Volume Graphics, 2006, 8 pages.
Kindlmann, G., "Visualization and Analysis of Diffusion Tensor Fields", PhD Thesis, The University of Utah, Salt Lake City, Utah, 2004, 159 pages.
Kindlmann, G., "Semi-Automatic Generation of Transfer Functions for Direct Volume Rendering", Masters Thesis, Cornell University, Ithaca, New York, 1999, 155 pages.
Bakker, P., "Image Structure Analysis for Seismic Interpretation", PhD dissertation, Delft University of Technology, 2002, 131 pages.
Haglund, L., "Adaptive Multidimensional Filtering", PhD Thesis, Linkoping University, Linkoping, Sweden, 1992, 163 pages.
Kass, M. et al., "Analyzing Oriented Patterns", Computer Vision, Graphics and Image Processing, 1987, 37, pp. 362-385.
Rao, A. R. et al., "Computing Oriented Texture Fields", CVGIP: Graphical Models and Image Processing, 1991, 53(2), pp. 157-185.
Search Report and Written Opinion of International Patent Application No. PCT/US2018/025624 dated Jul. 31, 2018, 21 pages.
International Preliminary Report on Patentability of International Patent Application No. PCT/US2018/025624 dated Oct. 10, 2019, 12 pages.
Search Report and Written Opinion of International Patent Application No. PCT/IB2014/063477 dated Oct. 23, 2014, 7 pages.
Office Action for U.S. Appl. No. 13/952,831 dated Jun. 29, 2015, 28 pages.
Notice of Allowance for U.S. Appl. No. 13/952,831 dated Feb. 4, 2018, 10 pages.
International Preliminary Report on Patentability of International Patent Application No. PCT/IB2014/063477 dated Feb. 11, 2016, 6 pages.
European Search Report for European Patent Application No. 14832508.7 dated Jul. 4, 2016, 4 pages.
European Exam Report for European Patent Application No. 14832508.7 dated Jul. 31, 2019, 5 pages.
Decision on Grant for Russian Patent Application No. 2015136466 dated Jan. 23, 2017, 15 pages.
Mexican Office Action for Mexican Patent Application No. MX/a/2015/009562 dated Jan. 26, 2017, 7 pages.
Official Notification for Russian Patent Application No. 2015136466 dated Jul. 1, 2016, 14 pages.
European Supplementary Search Report for European Patent Application No. 14743475, dated Jun. 15, 2016, 4 pages.
Search Report and Written Opinion of International Patent Application No. PCT/US2014/013255 dated Apr. 23, 2014, 9 pages.
International Preliminary Report on Patentability of International Patent Application No. PCT/US2014/013255 dated Aug. 6, 2015, 6 pages.
Office Action in U.S. Appl. No. 13/752,160 dated Aug. 5, 2015, 20 pages.
Office Action in U.S. Appl. No. 13/752,160 dated Apr. 8, 2016, 10 pages.
Office Action in U.S. Appl. No. 13/752,160 dated Oct. 21, 2016, 20 pages.
Office Action in U.S. Appl. No. 13/752,160 dated Jul. 28, 2017, 23 pages.
Office Action in U.S. Appl. No. 13/752,160 dated May 2, 2018, 22 pages.
Office Action in U.S. Appl. No. 13/752,160 dated Mar. 7, 2019, 21 pages.
Corrected Notice of Allowability in U.S. Appl. No. 13/752,160, dated Sep. 18, 2019, 7 pages.
Search Report and Written Opinion of International Patent Application No. PCT/US2014/013256 dated May 8, 2014, 9 pages.
Office Action in U.S. Appl. No. 13/752,183 dated Oct. 21, 2016, 23 pages.
Office Action in U.S. Appl. No. 13/752,183 dated Nov. 2, 2018, 38 pages.
Office Action in U.S. Appl. No. 13/752,183 dated Dec. 31, 2019, 26 pages.
Office Action in U.S. Appl. No. 13/752,183 dated Aug. 14, 2015, 27 pages.
Office Action in U.S. Appl. No. 13/752,183 dated Apr. 8, 2016, 14 pages.
Office Action in U.S. Appl. No. 13/752,183 dated Jul. 28, 2017, 22 pages.
Office Action in U.S. Appl. No. 13/752,183 dated Jun. 27, 2019, 23 pages.
International Preliminary Report on Patentability of International Patent Application No. PCT/US2014/013256 dated Jul. 28, 2015, 6 pages.
Office Action in U.S. Appl. No. 13/518,547 dated Nov. 10, 2015, 22 pages.
Office Action in U.S. Appl. No. 13/518,547 dated Jul. 5, 2016, 8 pages.
Search Report and Written Opinion of International Patent Application No. PCT/IB2010/055574 dated Aug. 31, 2011, 3 pages.
International Preliminary Report on Patentability of International Patent Application No. PCT/IB2010/055574 dated Jun. 26, 2012, 4 pages.
Haukas, J. et al., "Automated Salt Body Extraction from Seismic Using the Level Set Method", presented at the 74th EAGE Conference & Exhibition, Copenhagen, Denmark, 2012, 5 pages.
Haukas, J. et al., "Automated salt body extraction from seismic using the level set method", First Break, 2013, 31, pp. 35-42.
Office Action in Brazil Patent Application No. 112015017983.5 dated Mar. 30, 2020, 6 pages.

* cited by examiner

SMOOTH SURFACE WRAPPING OF FEATURES IN AN IMAGED VOLUME

CROSS-REFERENCE

This application is a National Stage Entry of International Patent Application No. PCT/US2018/025624 filed on Apr. 2, 2018, which claims priority to the filing date of U.S. Provisional Patent Application No. 62/479,577, filed Mar. 31, 2017.

BACKGROUND

This section is intended to introduce the reader to various aspects of art that may be related to various aspects of the presently described embodiments. This discussion is believed to be helpful in providing the reader with background information to facilitate a better understanding of the various aspects of the described embodiments. Accordingly, it should be understood that these statements are to be read in this light and not as admissions of prior art.

This disclosure relates to the computer simulation of physical objects and their interactions. In particular, but not by way of limitation, this disclosure relates to interpretation of features of imaged data, for example seismic data, medical data, or the like.

For example, salt interpretation from seismic data can be slow and complex. While some parts of the top and base salt are represented by easily identifiable seismic events, other sections may be poorly imaged. Poor imaging may occur, for example, due to an imperfect velocity model, especially during the initial sediment flood and salt flood migration steps. Conventional salt interpretation, which is mainly based on manual interpretation combined with automated tracking of events in a seismic volume, typically involves a series of operator-driven steps: determining control points, possibly line by line through the volume; where possible extending the control points into larger surface patches by applying criteria for lateral connectivity; and filling in missing pieces and determining outer edges (e.g. gaps and parts of the boundary that are poorly defined from seismic) using extra control points, through a combination of interpolation and extrapolation. However, such manual data interpretation methods are tedious, subjective, and time-consuming.

Automated solutions previously disclosed by the present applicant include U.S. Patent Application Publication No. 2014/0214328, which describes a workflow for automated feature extraction using level sets, and U.S. Patent Application Publication No. 2013/0158877, which describes a DNA-inspired search algorithm and extraction method that provides clear boundary parts.

BRIEF SUMMARY

In general terms, embodiments of the smooth surface wrapping methods and systems of the present disclosure provide automated feature interpretation in model building, require fewer floating point operations per iteration step and less memory, and result in reduced turnaround time and less subjective interpretation compared to conventional techniques.

Embodiments of the present disclosure provide automated workflows that allow for improved salt interpretation for velocity model building in seismic data processing. In particular, workflows of the present disclosure use a volume attribute to classify data into regions corresponding to feature/uncertain/non-feature categories and uses smoothing through the uncertain parts to connect the clear boundaries of the feature. Any volume attribute can be used as long as feature/uncertain/non-feature categories can be identified in terms of threshold values or ranges, wherein the ranges can be continuous or discontinuous ranges. For example, the methods and systems of the present disclosure can be used to separate seismic data into regions of most likely sediment, most likely salt, and uncertain regions, then to use smooth surface wrapping to resolve the uncertainties i.e. automatically determine whether the regions initially identified as uncertain are most likely sediment or most likely salt.

After the well-defined parts of a boundary are extracted by a DNA-inspired search algorithm and expanded into signal consistent surface patches by surface growing, the poorly defined parts of the boundary can be identified by smooth surface wrapping of a volume attribute in accordance with the present disclosure. The smooth surface wrapping process includes classifying data with respect to a feature as most likely yes (e.g. salt), most likely no (e.g. sediments), and uncertain as to whether yes or no. The smooth surface wrapping approach of the present disclosure, described in more detail below, honors both the well-defined boundaries and the classification into feature or non-feature (e.g. salt or sediments). In the uncertain regions, the workflow of the present disclosure produces a boundary that smoothly connects the well-defined boundary segments. The workflow has been tested on seismic reflection data and gives results comparable to those of manual interpretation, but in considerably shorter time.

BRIEF DESCRIPTION OF THE DRAWINGS

Embodiments of the present disclosure will now be described by way of example with reference to the accompanying drawings in which.

DETAILED DESCRIPTION

Figure 1:
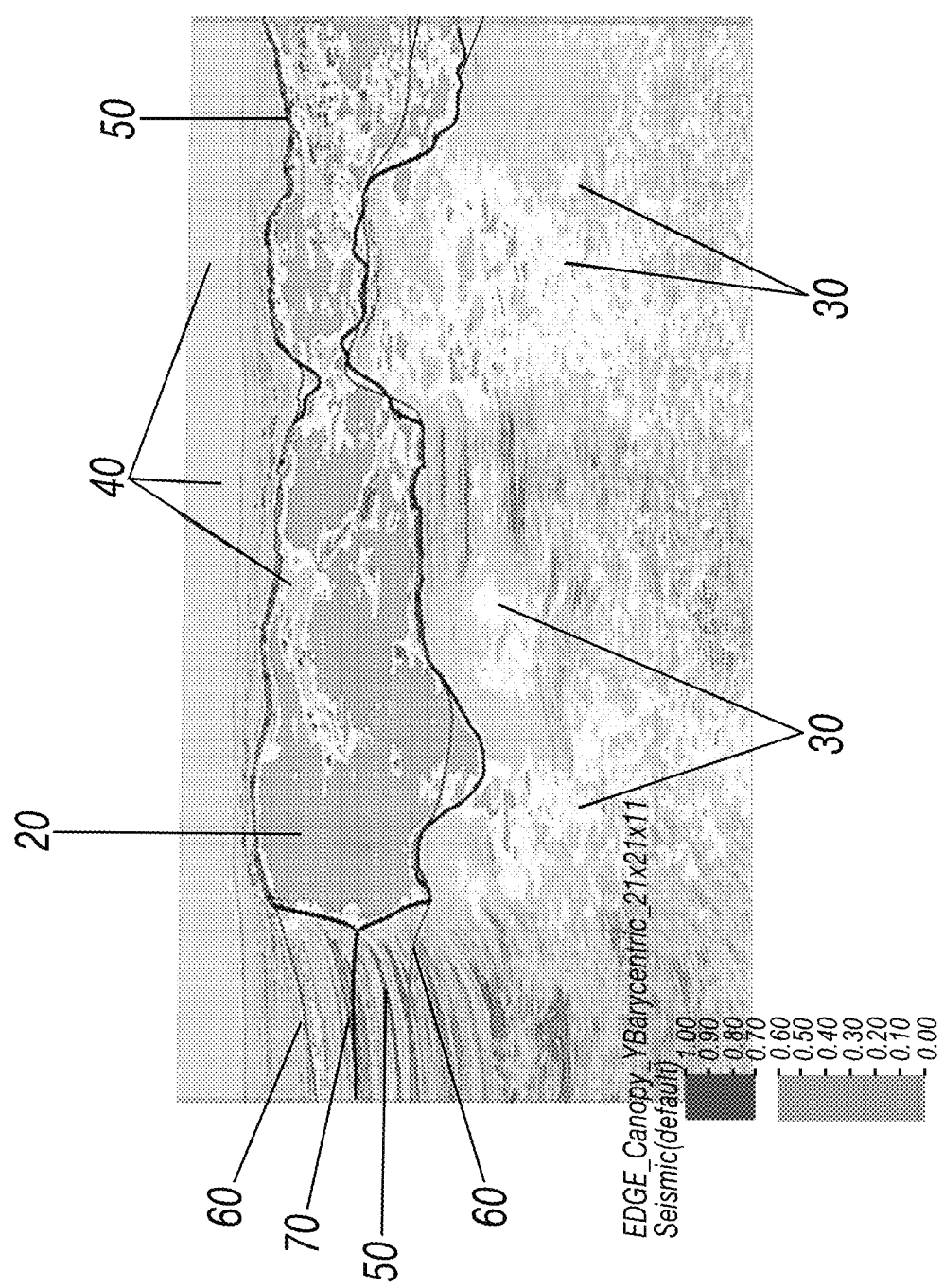
FIG. 1 shows an output of the smooth surface wrapping systems and methods in accordance with one or more embodiments of the present disclosure.

Reference will now be made in detail to embodiments, examples of which are illustrated in the accompanying drawings and figures. In the following detailed description, numerous specific details are set forth in order to provide a thorough understanding of the subject matter herein. However, it will be apparent to one of ordinary skill in the art that the subject matter may be practiced without these specific details. In other instances, well-known methods, procedures, components, and systems have not been described in detail so as not to unnecessarily obscure aspects of the embodiments.

This discussion is directed to various embodiments of the disclosure. The drawing figures are not necessarily to scale. Certain features of the embodiments may be shown exaggerated in scale or in somewhat schematic form, and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

The terminology used in the description of the disclosure herein is for the purpose of describing particular embodiments only and is not intended to be limiting of the subject matter. When introducing elements of various embodiments of the present disclosure and claims, the articles "a," "an," "the," and "said" are intended to mean that there are one or more of the elements. The term "and/or" as used herein refers to and encompasses any and all possible combinations of one or more of the associated listed items. The terms "comprising," "including," and "having" are used in an open-ended fashion, and thus should be interpreted to mean "including, but not limited to . . . ."

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The smooth surface wrapping methods and systems of the present disclosure are described for computer processing for seismic surveys, but the methods are not limited to computer processing for seismic surveys. Any computer processing for smooth surface wrapping of a feature for 2D, 3D or higher-dimensional systems may use the methods and/or systems described below.

Certain terms are used throughout the description and claims to refer to particular features or components. As one skilled in the art will appreciate, different persons may refer to the same feature or component by different names. This document does not intend to distinguish between components or features that differ in name but not function, unless specifically stated.

The present disclosure is directed to systems and methods for data processing and interpretation and includes wrapping one or several surfaces around a feature to be found in an imaged volume. Embodiments of the present disclosure can be used in various applications, for example, salt interpretation in seismic imaging, where the feature to be found is a salt body in a seismic volume. However, while described with regard to seismic imaging, including salt body interpretation, the present disclosure is equally applicable to medical or other data imaging, for example to wrap a surface around a feature in a medical image or in any imaged volume in which there may be clear and unclear portions and a need for automated interpretation of the unclear portions while keeping the clear portions intact.

The systems and methods of the present disclosure may be used to interpret an attribute of an imaged volume that by thresholding or image segmentation can be separated into at least three categories: (1) most probably feature (e.g. salt), (2) most probably non-feature (e.g. non-salt sediments), and (3) uncertain.

One or more initial surfaces of a feature are extrapolated to the edges or outer points of an imaged volume. The imaged volume may be any of a variety of three-dimensional shapes, including without limitation a cube, a cuboid, a prism, a pyramid, a sphere, a cylinder, or a cone, for example. A surface may be a 2D polygon or a 3D surface collection of data points. Each initial surface of the feature is separately identified or labelled. For example, any number of initial surfaces of a feature may be labelled according to their positions relative to each other, for non-limiting example as a top surface and a base surface, and then extrapolated. In the level set approach, for a general parameterization of 3D objects in a single-z system (only a single point in the vertical direction), there may be multiple tops and bases that can connect to form a boundary of a 3D object, e.g., a first top and a first base, then a next top and a next base, and so on, i.e. an essentially binary approach. In the methods of the present disclosure, an implicit surface approach may additionally or alternatively be used, as described further below, wherein a fixed part acts as a constraint and the surface can be an implicit surface with a boundary placed in a region of uncertainty.

If surface parts with high confidence are available from a separate interpretation step (e.g. interpreted parts of top or base salt), these parts can be used as input to the extrapolation that creates the initial surfaces. In such a case, the high confidence surface parts may constrain and remain a fixed part of the surfaces throughout the modification or smooth wrapping process. On the other hand, if no such high confidence surface parts exist, the initial surfaces can be selected as flat surfaces close to the top or base of the volume, for example, or surfaces extrapolated from a set of input points.

The systems and methods of the present disclosure can be used to modify the initial surfaces to smoothly wrap the features of interest in the volume (e.g. salt). The smooth surface wrapping is an iterative process in which volume attribute values are extracted at the surface points in each iteration step, and the surface points are modified as detailed below.

For a first or top surface, the parts that according to a volume attribute cut across the feature to be wrapped will be shifted up a prescribed number of samples per iteration. The parts that cut across non-feature regions will be shifted down a prescribed number of samples per iteration.

For a second or base surface, the parts that according to a volume attribute cut across the feature to be wrapped will be shifted down a prescribed number of samples per iteration. The parts that cut across non-feature regions will be shifted up a prescribed number of samples per iteration.

Each data volume attribute may represent a position of the surface to move up, down, or otherwise at point locations if the surface is mispositioned before smoothing Where the surface has moved will update information regarding if the surface is now located consistently with points or voxels therearound, until the position has converged such that it makes sense with the constraints.

For surface parts that cut across uncertain regions, no explicit shift will be applied. However, after shifting the surface parts that cut across feature or non-feature regions, a surface smoothing step is invoked. This step implies that parts that cut across uncertain regions will be smoothed. Accordingly, noisy regions with small isolated uncertain zones can be overcome in the search for a more extensive and smooth feature boundary.

At the end of each iteration step, the parts that were input as high confidence boundary parts are reinforced or fixed at their locations to be part of the surfaces.

The workflow is run iteratively until the number of surface points updated in one iteration step is less than a prescribed level or until a maximum number of iteration steps has been reached.

The systems and methods of the present disclosure result in a set of surfaces that smoothly wrap the features sought in the volume (e.g., a seismic volume) and honor the parts that were pre-determined with high confidence. Any parts where a top surface is below a base surface and vice versa can be disregarded as no feature to be wrapped has been found in these regions.

Inputs may include without limitation: an attribute of the seismic volume; threshold values that separate the volume attribute into the three categories of feature/uncertain/non-feature; initial surface(s) extrapolated to the boundary of the volume, which may further include pre-defined boundary parts with high confidence; an applied shift per iteration (e.g. number of samples, typical value 2); smoothing applied per iteration (e.g. filter width and number of iteration steps); and/or convergence criteria. Convergence criteria may include, for example, a minimum shift per iteration for a surface point to be considered still moving (typically set equal to the applied shift per iteration), a number of surface points still moving when convergence is accepted, and/or a maximum number of iteration steps. If the applied shift per iteration is defined as a number of samples (e.g. 10 up, 10 down), a typical number may be on the order of 2; however, the number of samples may be any positive number, e.g., 1, 2, 3, 4, 5, 10, 100, or more, or any fraction of a sample number or multiplier of a sample number. Samples need not be equidistant and may be any certain non-zero distance surface information should move up or move down. Samples also need not be the same for a given surface over time, and need not be the same for a give locale, area, neighborhood, or region, for example one number may be 2 and another can be 10 in different locations at the same time iteration.

The smooth surface wrapping of the present disclosure creates from these inputs one or several surfaces smoothly wrapping the feature sought in the volume. For example, the present disclosure may allow for automated salt interpretation in velocity model building. Subsequent re-migration may further clarify identification of a feature.

In embodiments, a smooth surface wrapping method or system of the present disclosure may include, for example: separating a volume attribute into feature—uncertain—non-feature parts; defining initial surface(s) that cover the seismic volume, for example, based on extrapolation from clear interpreted boundary parts which may be kept fixed after the extrapolation; (a) extracting values of the volume attribute along the surface(s), (b) applying a shift if cutting across a feature or a non-feature part (but not if the part is uncertain); (c) smoothing; and (d) reinforcing clear interpreted boundary parts if applicable; iterating steps (a)-(d) above; and checking for convergence or stop periodically or at intervals, for example after a given number of iteration steps.

In particular, the methods and systems of the present disclosure include defining feature—uncertain—non-feature, only applying explicit shifts if cutting across feature or non-feature, then smoothing, and iterating until convergence. This results in uncertain regions being smoothed more than, for example, merely moving the surface according to the value of a volume attribute and iterating until convergence. Moreover, the present disclosure allows for noisy uncertain regions to be bypassed in the search for a more extensive or significant feature boundary.

The step of defining feature—uncertain—non-feature may be accomplished by applying thresholds on a volume attribute. Thresholds can be user-defined and are applied to the entire value range of samples in the volume being investigated to effect a separation of each sample into one of three or more classes, e.g., a first certain class, a second and different certain class, and an uncertain class. Threshold ranges for each class need not be sequential or continuous, and may include discontinuous sub-ranges. Other steps may include moving wrapping surface(s) away from an interior of feature/non-feature ranges and smoothing through uncertain parts.

A single class, or more than one class, may be used to inform and/or control any movement of a surface—whether there is a need to move, if so in which direction, and if so how far to move (distance per iteration step as above). Potential directions of movement may depend on the surface parameterization. For example, a single-z surface may allow movement only literally up and down; in contrast, with an implicit surface or a level set parameterization the surface can move in a direction normal to the boundary (the specific direction depending on which way normal is pointing). For the purposes of this disclosure, therefore, the terms "up" and "down" for relative movement or shifting may encompass any pair of opposing directions whether with reference to a single-z surface or normal to the boundary for an implicit surface or multi-z (level set) parameterization.

The systems and methods of the present disclosure may be implemented as a Schlumberger Petrel workflow or other workflow. Regardless of type of workflow, the user input may include, for example: volume attribute (e.g. seismic cube); volume attribute thresholds (e.g. feature—uncertain—non-feature); initial surface(s), possibly separated into clear interpreted parts and extrapolated parts; absolute value of shift applied at surface point in each iteration step if crossing through feature/non-feature (measured in number of samples, typical value 2); degree of smoothing (iterations and filter width); maximum number of iteration steps; maximum shift of surface point between iteration steps to be labeled as not moving; and/or minimum number of surface points still moving to keep iterating. The workflow may include, for non-limiting example only, extrapolating a surface, keeping track of a high confidence part of the surface, keeping track of previous interim surface positions, and iterating on the following: extract volume attribute values along surface; calculate shift to be applied based on attribute along surface, e.g., shift top above feature or below non-feature, shift base below feature or above non-feature; set shift to zero where high confidence parts; apply shift; smooth surface(s) and reinforce (keep fixed) high confidence parts; check for convergence; continue to iterate if not converged and if maximum number of iterations not reached.

In the event the initial top surface is below the feature to be identified, or the initial base surface is above the feature to be identified, to initiate wrapping, the initial top surface can be shifted to the top of the seismic data and the initial base surface to the base of the seismic data.

The systems and methods of the present disclosure have been tested on the Schlumberger EDGE multi-client data set, sediment flood, and final model. Input was top and base salt surface parts tracked by seismic DNA (see U.S. Patent Application Publication No. 2013/0158877) and auto-tracking. Output was a pair of top and base horizons smoothly wrapped around vector attribute highlighting salt versus sediments. Results are shown in FIG. 1. Results were validated against conventional manual interpretations.

In particular, FIG. 1 shows the intersection of a seismic volume with a transparent attribute overlay. As shown, the attribute is separated into the three categories of: feature 20, uncertain 30, and non-feature 40. In the example of FIG. 1, such separation was shown in the original by differentiation in color—green for feature 20, white for uncertain 30, yellow for non-feature 40. However, any differentiation in color, shade (e.g. if black-and-white), or pattern, for example, can be used.

In FIG. 1, clear boundary parts 50 are shown. The clear boundary parts 50 were interpreted in advance. Initial surfaces were 60 extrapolated from the clear boundary parts 50. Final surfaces 70 were determined after iterating until convergence.

Figure 2:
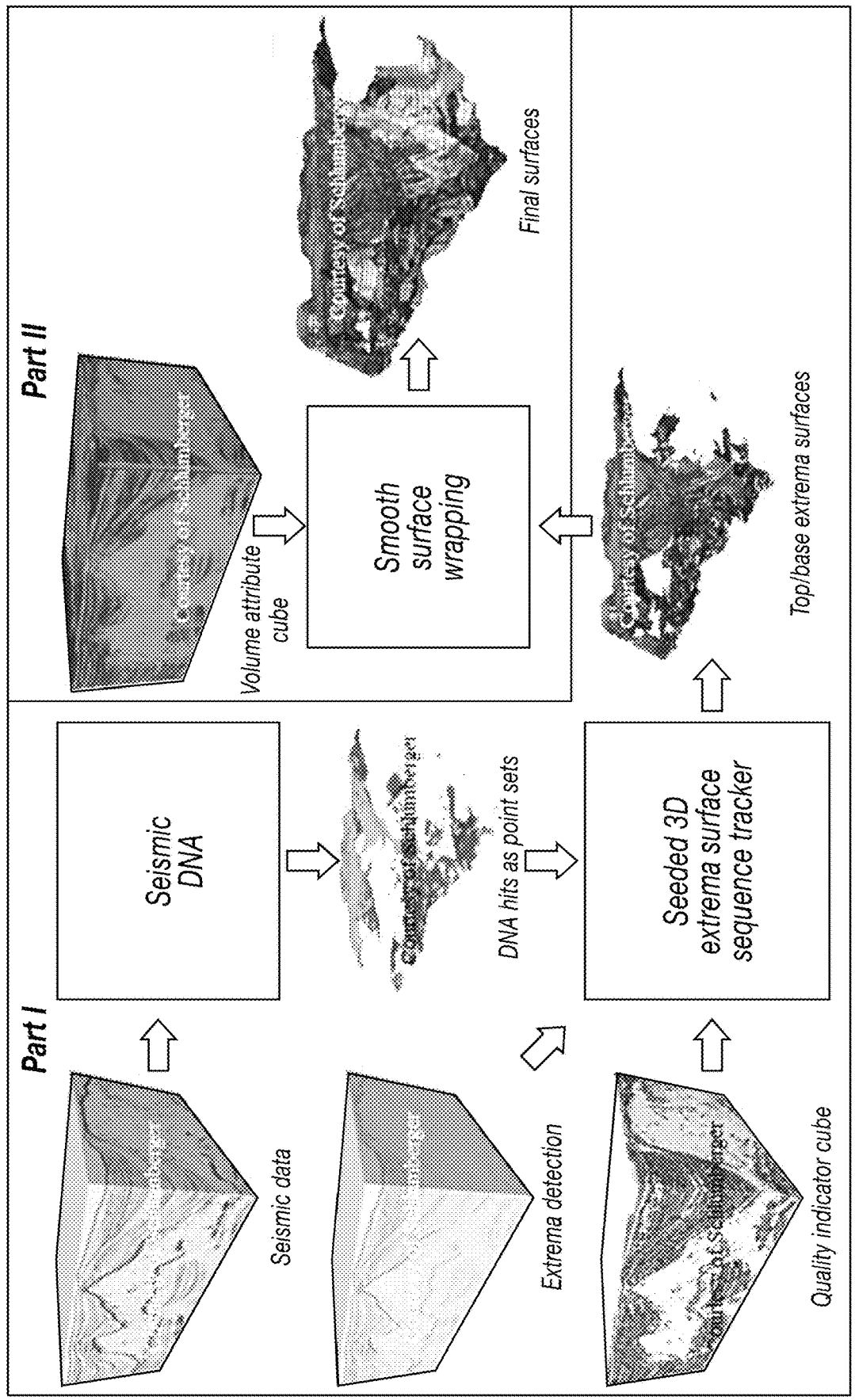
FIG. 2 schematically shows a combined workflow including the smooth surface wrapping systems and methods in accordance with one or more embodiments of the present disclosure.

Referring now to FIG. 2, a combined workflow including the smooth surface wrapping systems and methods in accordance with one or more embodiments of the present disclosure is schematically shown. In embodiments, the systems and methods of the present disclosure can be used as a part of a workflow for fully automated salt interpretation from seismic data in which a DNA-inspired search algorithm is first used in combination with a seeded 3D extrema surface sequence extraction method, for example as described in U.S. Patent Application Publication No. 2013/0158877. As depicted in FIG. 2, in Part I of the workflow, the extraction of clear salt boundary parts is based on determining the seismic signature of top and base salt, referred to as the seismic DNA. By searching through the seismic volume, a point set of locations that match the seismic signature is obtained. The point set is then extended into connected peak/trough surface patches, applying constraints on similarity of the seismic signal.

Figure 3:
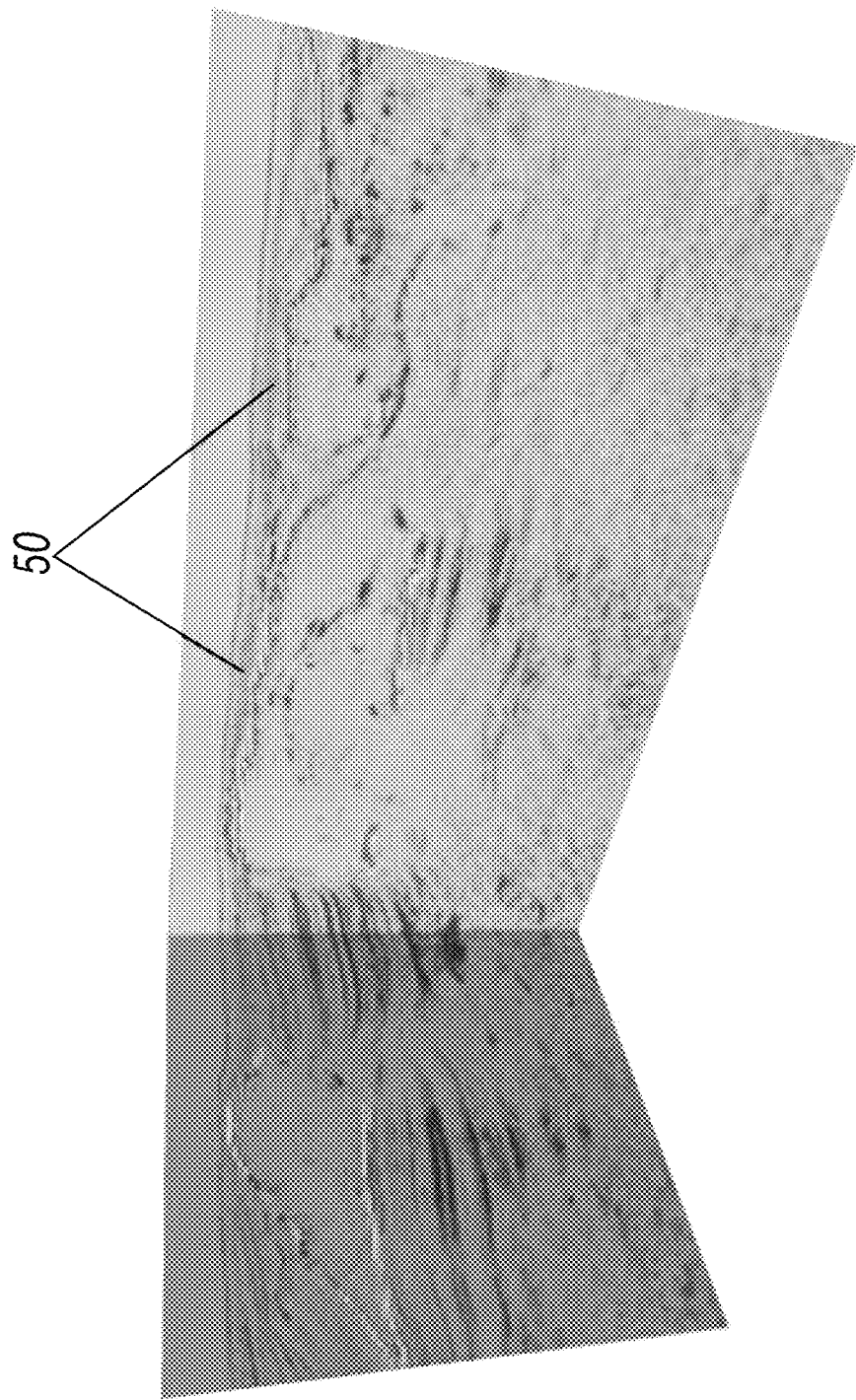
FIG. 3 shows an output of a first portion of a combined workflow that provides input to the smooth surface wrapping systems and methods in accordance with one or more embodiments of the present disclosure.

When Part I of the salt identification workflow is completed, clear boundary parts 50 are identified, and missing pieces mainly include flanks and parts of the base of salt, as shown in FIG. 3. The results generally show large gaps between the surface patches, mainly along the flanks and parts of the base of salt.

In Part II of the combined workflow, a method of the present disclosure is used to fill in the missing pieces by smooth surface wrapping of a volume attribute that separates between sediments and salt. Accordingly, FIG. 2 schematically represents an automated salt interpretation, in which a DNA-inspired search algorithm is used to identify control points along top and base salt; a seeded surface growing algorithm then connects the points into signal-consistent surface patches; and a smooth surface wrapping algorithm of the present disclosure is used to fill in the missing pieces.

Classification of data into (a) most likely feature, (b) most likely non-feature, and (c) uncertain regions as part of the present method will now be described. While the context of the description is classification of seismic data into most likely sediments, most likely salt, and uncertain regions, it is recognized that the present disclosure is equally adaptable to other image or volume types for which the data has varying degrees of certainty. For example, uncertain regions exist in seismic data due to imperfections in the velocity model resulting in poor imaging or poor focusing and the like. The systems and methods of the present disclosure are configured to extract as much certain information as possible from the data and consequently reduce the range of possible locations for the uncertain (e.g. poorly imaged) parts of the boundary (e.g. strongly dipping flanks, diapirs, and base salt below complex salt domes).

Figure 4:
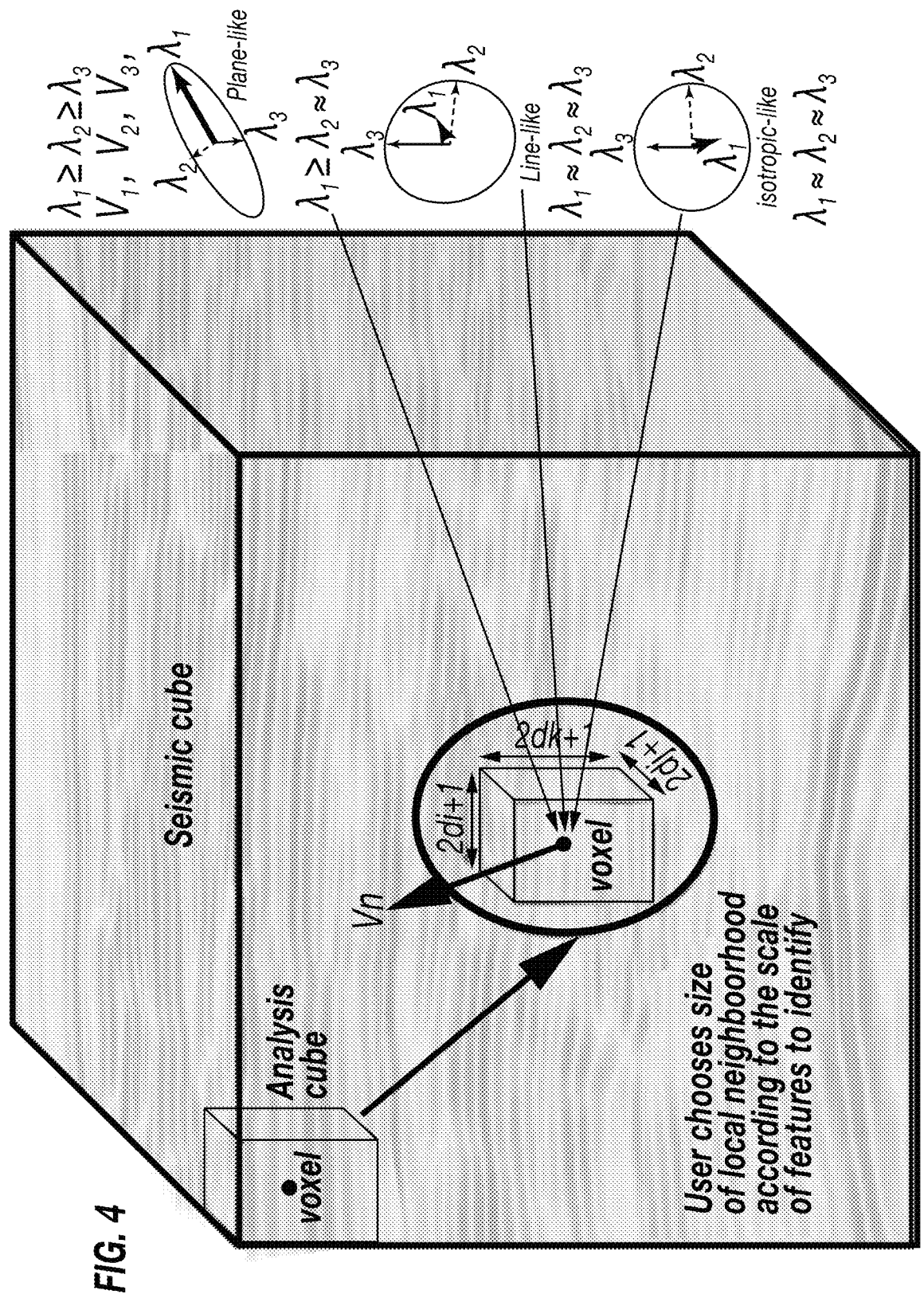
FIG. 4 shows an output of the smooth surface wrapping systems and methods including seismic analysis using normal vector field in accordance with one or more embodiments of the present disclosure.
Figure 5:
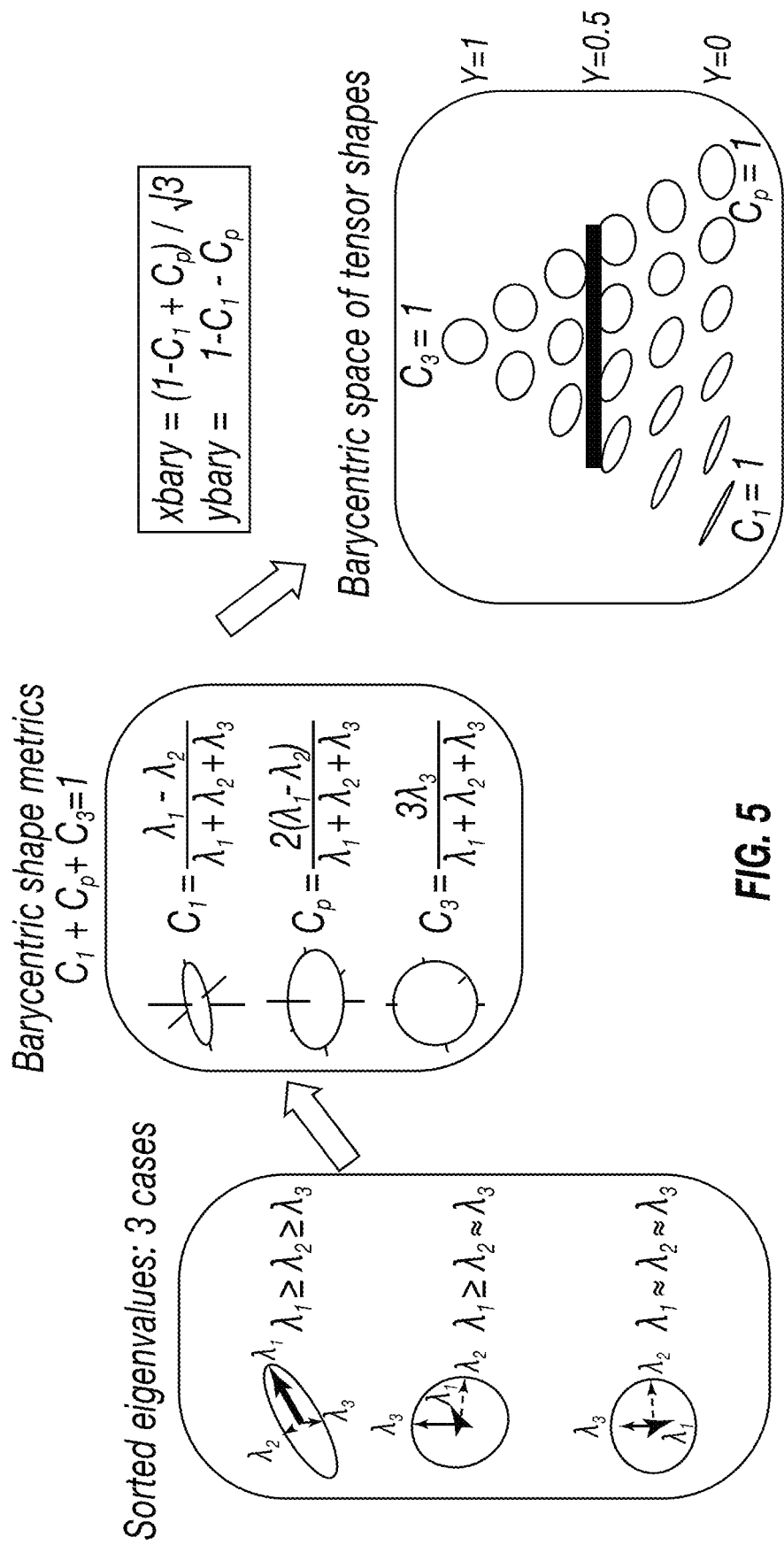
FIG. 5 shows an output of the smooth surface wrapping systems and methods from structure tensor to barycentric space in accordance with one or more embodiments of the present disclosure.

Referring now to FIG. 4, in embodiments, 3D seismic data is transformed into a vector field representing the local orientation of the seismic data e.g. normal to the seismic layering. A structure tensor is then generated for this vector field and analyzed in terms of principal directions (eigenvectors) and their weights (eigenvalues) within a user-defined neighborhood. The eigenvalues are sorted and normalized. By introducing a barycentric space (FIG. 5), a series of different eigenvalue metrics related to the shape of the underlying tensor can be analyzed. In FIG. 5, in which results are shown from structure tensor to barycentric space, the y-barycentric coordinate has a value range from 0 to 1, where the value of 0.5 represents the transition midpoint between order and chaos (red line).

The projection onto the barycentric space allows identification of chaotic patterns, examples of which are shown as concentrated in the upper corner of the triangle of FIG. 5. In this embodiment, the Y-barycentric coordinate, which runs vertically through the triangle and corresponds to three times the third (smallest) eigenvalue, is an intuitive metric ranging from 0 to 1. Perfect order corresponds to a value of 0, while no structure (perfect chaos) corresponds to a value of 1. The value of 0.5 is the transition midpoint between order and chaos (red line in FIG. 5). In practice, due to uncertainties in the seismic data, the transition is represented by a range of values around 0.5.

Figure 6:
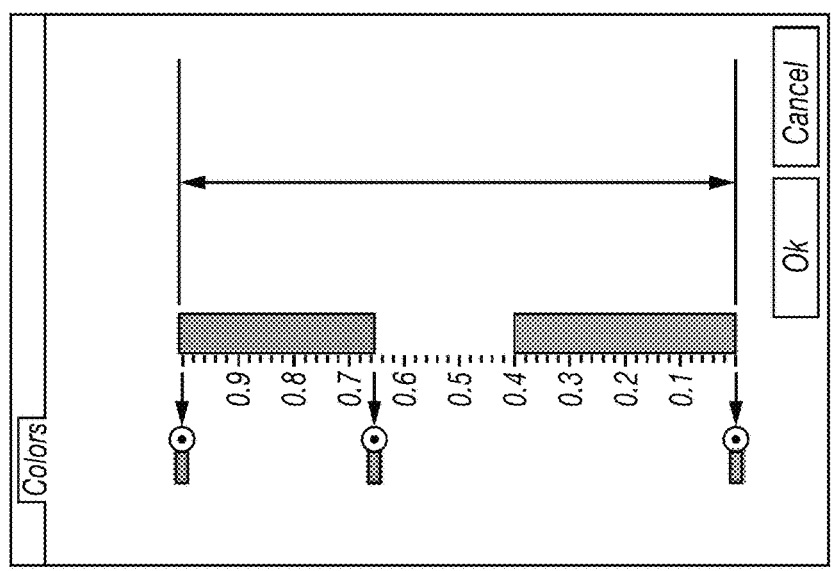
FIG. 6 shows an output of the smooth surface wrapping systems and methods with Y-barycentric attribute overlaid on seismic intersection with a transparency of 50% in accordance with one or more embodiments of the present disclosure.
Figure 6:
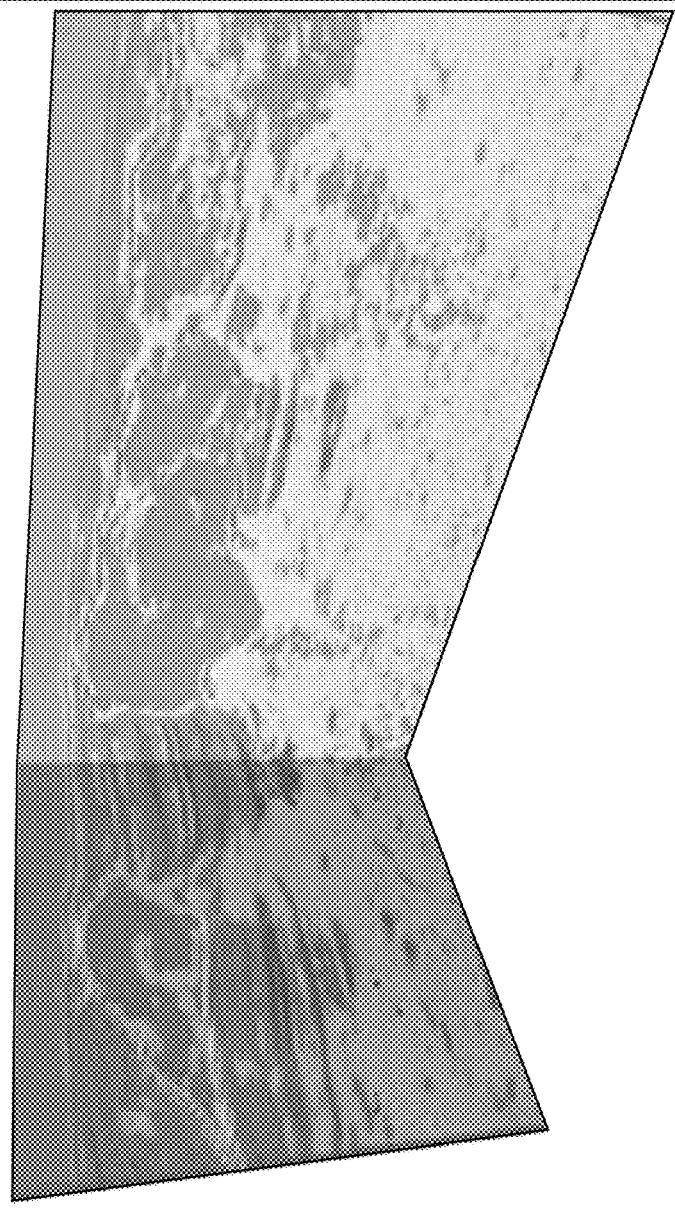

Referring now to FIG. 6, an output of the smooth surface wrapping systems and methods with Y-barycentric attribute overlaid on seismic intersection with a transparency of 50% in accordance with one or more embodiments of the present disclosure is shown. Y-barycentric values may be stored as a volume attribute that enables intuitive interaction between visualization and attribute thresholding. A color template may be used and/or modified to separate the values between 0 and 1 into most likely salt (e.g. green), most likely sediments (e.g. yellow) and uncertain transition between chaos and structure (e.g. white). A multi-color template may be used, for example, for interactive visualization and attribute thresholding. By shrinking or extending the white part of the value range and inspecting the effect on the seismic overlay, appropriate thresholds for what is most likely salt and most likely sediment regions can be determined.

If a small neighborhood is selected for the structure tensor calculations in FIG. 4, the attribute provides a detailed, but sometimes quite scattered picture of the seismic structure. The attribute smoothness could be enhanced by increasing the neighborhood or smoothing the attribute in a post-processing step, with the risk of reducing the accuracy of the salt versus sediment classification. Accordingly, in embodiments, a reasonable amount of detail is kept in the attribute response and smoothness constraints are introduced in the salt boundary extraction algorithm.

Smooth Surface Wrapping of Volume Attribute

Smooth surfaced wrapping of volume attribute in accordance with systems and methods of the present disclosure will now be described. As shown in the workflow of FIG. 2, such systems and methods may be used to combine boundary parts that are well-defined seismic events, as illustrated in FIG. 3, with boundary parts that are connected with the well-defined boundary parts and honor the volume attribute classification illustrated in FIG. 6. This implies that the salt boundary should not cut across regions classified as salt or sediment, but be positioned in the transition zone between salt and sediments. The systems and methods of the present disclosure also may be used to constrain the curvature of the boundary, in particular in regions of high uncertainty.

Figure 7:
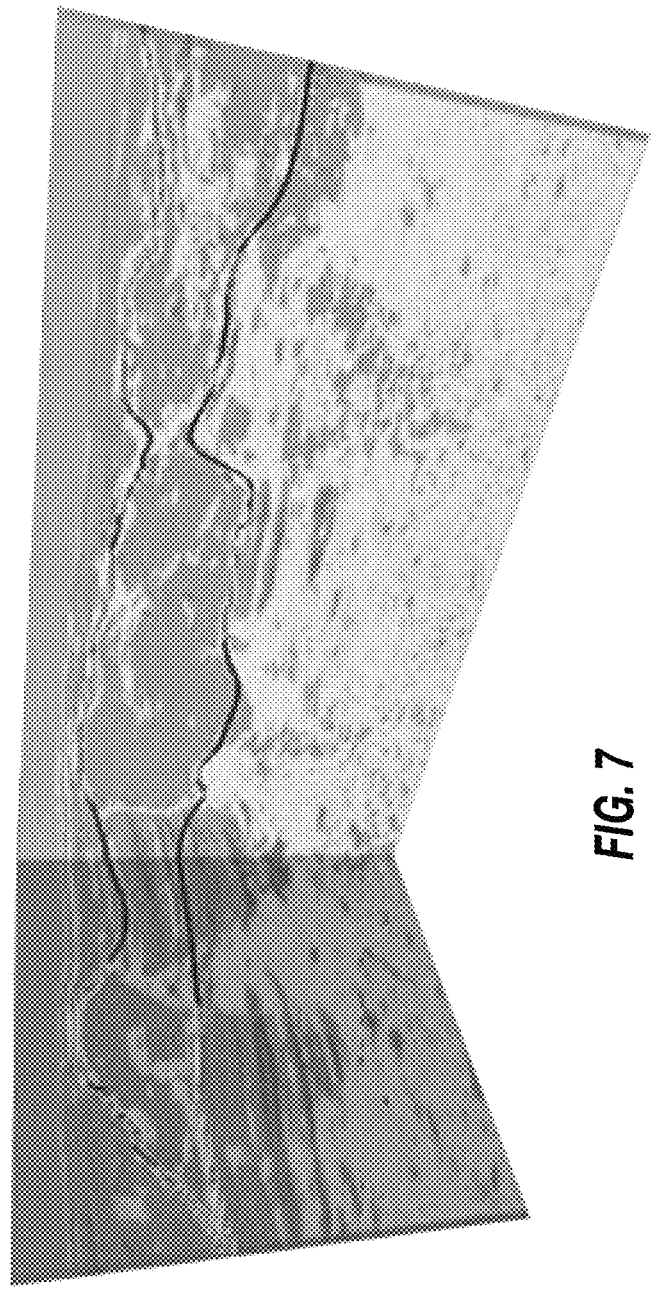
FIG. 7 shows an output of the smooth surface wrapping systems and methods with seismic intersection and overlay of the Y-barycentric volume attribute, extracted clear boundaries, and extrapolation of the clear boundaries to the edge of the seismic cube in accordance with one or more embodiments of the present disclosure.

In embodiments, surface patches that correspond to well-defined top and base boundary parts may be inputted as hard constraints, and will not be modified. Subsequently, these parts may be extrapolated to the boundaries of the seismic cube. At this point, parts of the boundary will most likely cut across regions classified as salt (green) or sediments (yellow) (FIG. 7). To resolve these inconsistencies and extract more optimal salt bodies, one or more of a set of rules may be applied. Such rules may include for example:

If top salt cuts across a salt region (green), it should be moved upwards;

If top salt cuts across a sediment region (yellow), it should be moved downwards;

If base salt cuts across a salt region (green), it should be moved downwards;

If base salt cuts across a sediment region (yellow), it should be moved upwards;

If the boundary is part of the inputted well-defined boundary parts, no displacement is applied; and/or If the boundary cuts across an uncertain region (white), no explicit displacement is applied. This part of the boundary can still move if the boundary is smoothed.

An example is shown in FIG. 7, which illustrates seismic intersections with overlay of the Y-barycentric volume attribute and extracted well defined boundaries (pink) interpolated and extrapolated to the edge of the seismic cube (blue). To honor the attribute response, the extrapolated surfaces may have to be modified where they cut across mostly yellow or green.

Any such rules can be applied iteratively. In embodiments, in each iteration step, the boundary may be moved a user-selected distance (e.g. one voxel) locally according to the rules, and smoothed to remove irregularities. The parts of the boundary that cut across uncertain (white) regions will thus only be modified by the smoothing step. The iterative application of the rules then proceeds based on the new boundary position.

The methods and systems of the present disclosure can be used with either explicit single-z surface representations of top and base salt, or an implicit level set representation of the salt body. With explicit surfaces, the rules may be applied to each surface separately. With an implicit level set representation of the salt body, the rules imply that the salt body may grow in regions where the boundary cuts across regions classified as salt, shrink where the boundary cuts regions classified as sediments, and be smoothed elsewhere.

Figure 8:
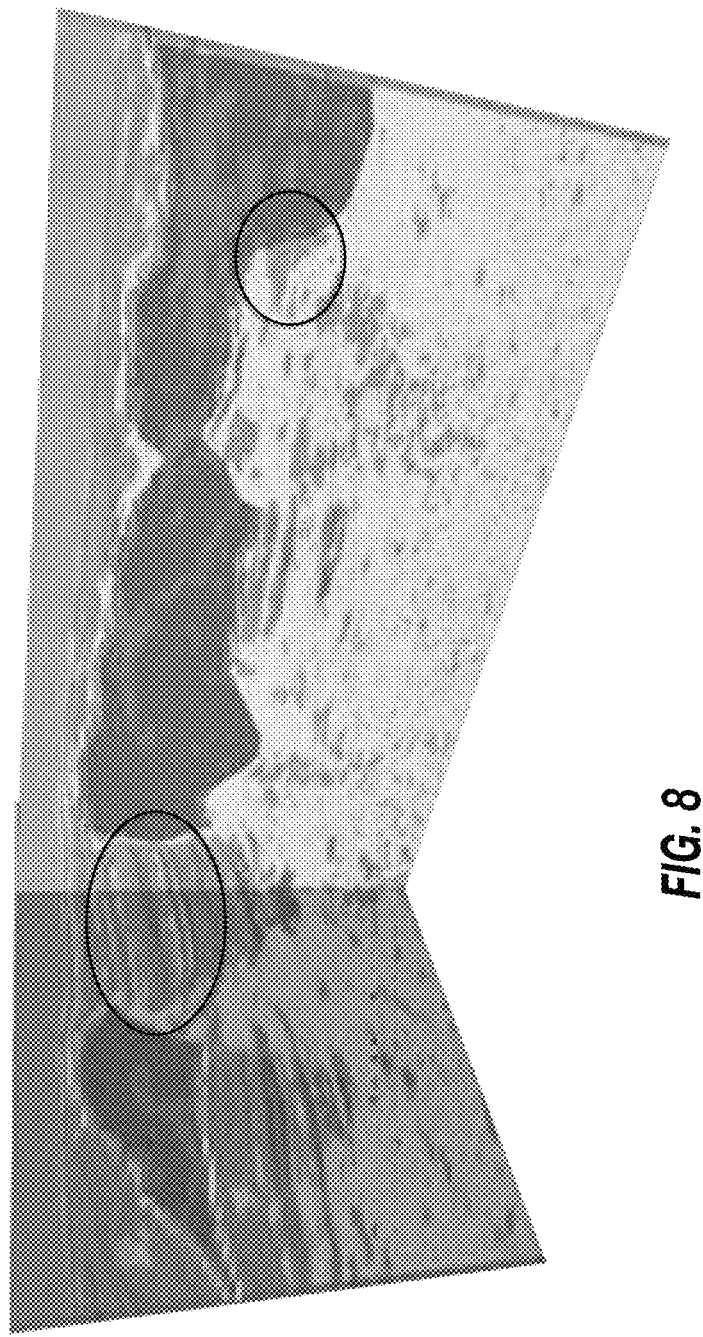
FIG. 8 shows an output of the smooth surface wrapping systems and methods with explicit single-z representation of top and base salt in accordance with one or more embodiments of the present disclosure.

In embodiments, convergence criterion applied to this process may be or include that none of or only a small number of boundary points move more than a specified distance (e.g. half a voxel) during an iteration step. Once convergence is achieved, the boundary will consist of the inputted well-defined boundary parts combined with boundary parts that are located in the transition zone between most likely salt and most likely sediments (FIG. 8). An exception to this rule occurs if a single-z surface representation is used and multi-z features are present.

In regions where there should be holes in the salt body, base salt may move above top salt and vice versa as no salt response can be found to restrict the surfaces. If this occurs, these boundary parts are no longer updated. At convergence, they can be removed. This creates appropriate holes in the salt body, as shown in FIG. 8. FIG. 8 illustrates a result with explicit single-z representation of top and base salt—the grey overlay shows the extracted salt region, the red circle to the left highlights where top salt has moved above base salt and the collapsed boundary has been removed, and the red circle to the right highlights multi-z features that a pair of single-z surfaces cannot resolve.

Figure 9:
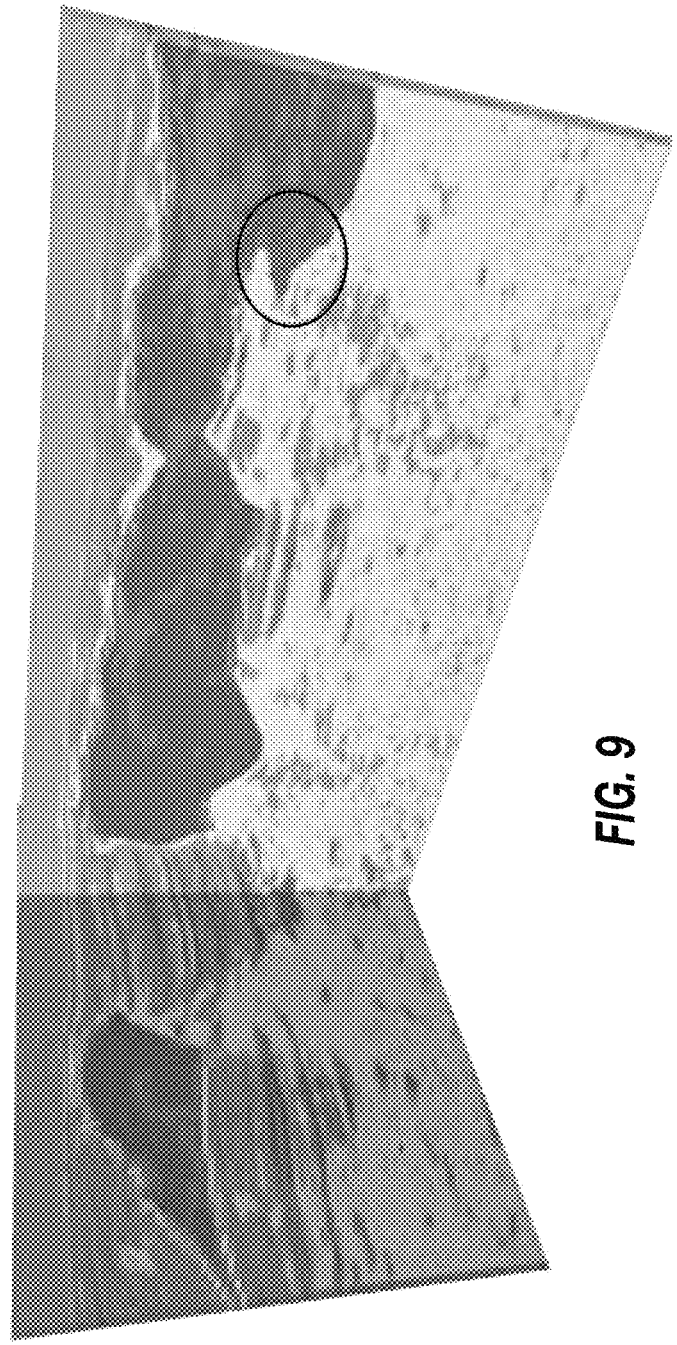
FIG. 9 shows an output of the smooth surface wrapping systems and methods after introducing an implicit surface level set representation to resolve multi-z features in accordance with one or more embodiments of the present disclosure.

If multi-z features are present, a single-z representation of top and base salt is not sufficient (FIG. 8). Most of the surface points on a single-z surface may honor the rules applied, but the surface may still cut across salt regions through large jumps in elevation. In this case, the single-z top and base surfaces are used to create a level set salt body representation (Haukås et al. 2013). The boundary modifications can then be applied in 3D and not only upwards and downwards, enabling multi-z features to be represented (FIG. 9).

Figure 10:
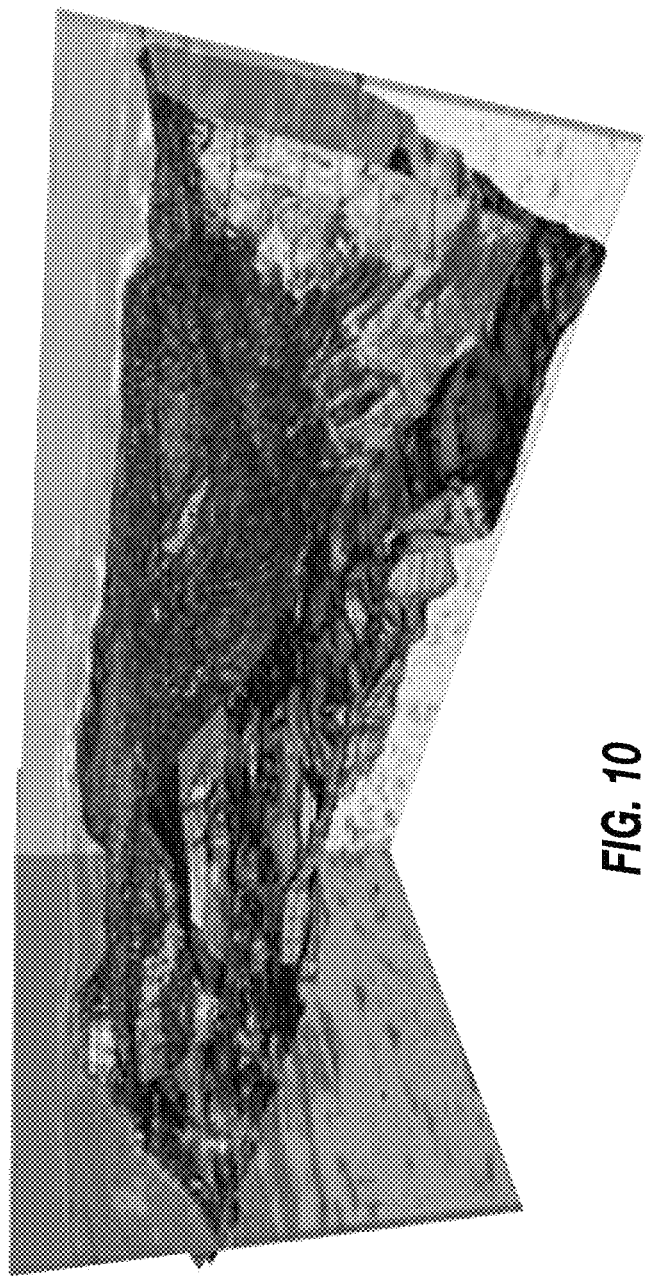
FIG. 10 shows an output of the smooth surface wrapping systems and methods as sequence of single-z horizons in accordance with one or more embodiments of the present disclosure.
Figure 11:
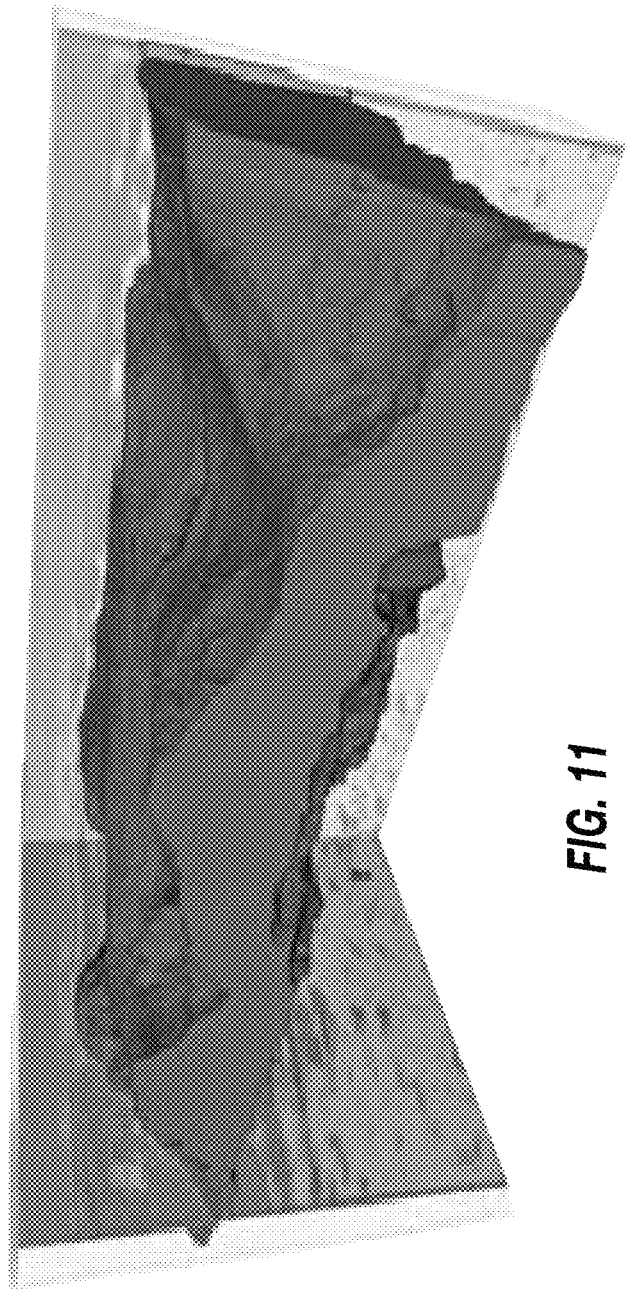
FIG. 11 shows an output of the smooth surface wrapping systems and methods as triangulated mesh in accordance with one or more embodiments of the present disclosure.

Output or results produced with the presented workflow can be represented in a variety of ways, for example as a sequence of single-z top and base salt surfaces (FIG. 10) or as a triangulated geobody mesh (FIG. 11).

Figure 12:
FIG. 12 shows a comparison between a conventional manual interpretation and an output of the smooth surface wrapping systems and methods in accordance with one or more embodiments of the present disclosure.

FIG. 12 shows a comparison between sample results of a workflow of embodiments of the present disclosure and corresponding manually interpreted top and base salt surfaces comprising multiple single-z surfaces. Once the signature of top and base salt and thresholds for the volume attribute have been established, no manual intervention is required in the workflow of the present disclosure. The results are thus obtained in much shorter time, reducing turnaround time from weeks to days or from days to hours.

The method can be a computer-based method in which steps can be performed using one or more processors. Further aspects of the present disclosure provide: a computer program comprising code which, when run on a computer, causes the computer to perform the smooth surface wrapping method as described; a computer readable medium storing a computer program comprising code which, when run on a computer, causes the computer to perform the smooth surface wrapping method as described; and a computer system programmed to perform the smooth surface wrapping method as described, for example. The system thus corresponds to the smooth surface wrapping methods as described. The system may further include: a computer-readable medium or media operatively connected to the processors, the medium or media storing the location of the starting object within a volume, and storing the values of the one or more attributes at the data points. The system may further include: a display device for displaying the evolved surface(s) and/or boundary, in 2D, e.g., as a cross section of the geobody rendered, for example on a seismic intersection, as a polygon representing the salt body boundary, or 3D.

The invention claimed is:

1. A method of wrapping a surface around a feature in an imaged volume, comprising:
    separating the volume into regions corresponding to a probable presence of the feature, a probable absence of the feature, and an uncertainty as to the presence or the absence of the feature;
    defining an initial surface of the feature;
    determining whether a part of the initial surface has high confidence;
    modify the initial surface, which includes:
        for the regions determined to be of probable presence and probable absence of the feature, extracting volume attribute values along the initial surface and shifting the initial surface; and
        for the regions corresponding to the uncertainty, not shifting the initial surface and instead smoothing the initial surface;
    reinforcing any part determined to have high confidence by setting a shift to zero; and
    iterating over the modifying and reinforcing steps for interim surfaces until the earlier of convergence or a predefined maximum number of iteration steps is reached.

2. The method of claim 1, wherein the feature is a salt body in a seismic volume.

3. The method of claim 1, further comprising:
    extrapolating the defined initial surface of the feature to an outer point or edge of the imaged volume.

4. The method of claim 1, wherein the shifting of the initial surface for regions determined to be of probable presence and probable absence of the feature comprises shifting a first portion of the initial surface that cuts across the region of probable presence of the feature up a prescribed number of samples per iteration and shifting a second portion of the initial surface that cuts across the region of probable absence of the feature down a prescribed number of samples per iteration.

5. The method of claim 1, wherein the iterating over the modifying step for interim surfaces comprises at each iteration shifting a first portion of the interim surface that cuts across an interim region of probable presence of the feature down a prescribed number of samples and shifting a second portion of the interim surface that cuts across an interim region of probable absence of the feature up a prescribed number of samples.

6. The method of claim 1, further comprising:
    receiving user input, wherein the user input comprises one or more of a volume attribute, a volume attribute threshold, the initial surface, an absolute value of shift applied at a surface point of the interim surface in each iteration step if crossing through a region of probable presence or absence of the feature, a maximum number of iteration steps, a maximum shift of a surface point between iteration steps to be labeled as not moving, and a minimum number of surface points still moving to keep iterating.

7. The method of claim 6, wherein the volume attribute is a seismic cube.

8. The method of claim 6, wherein the volume attribute threshold is for determining whether the region is one of probable presence of feature, uncertainty, or probable absence of feature.

9. The method of claim 6, wherein the initial surface is separated into clear interpreted parts and extrapolated parts.

10. The method of claim 6, wherein the absolute value of shift is a number of samples.

11. A method of wrapping a surface around a feature in an imaged volume, comprising:
- separating a volume attribute into feature, uncertain, and non-feature parts;
- defining an initial surface that covers the imaged volume; and
- iterating until reaching convergence or a prescribed maximum number of iterations without convergence on steps comprising:
  - (a) extracting values of the volume attribute along one of the initial surface or an interim surface,
  - (b) applying a shift when the initial surface or interim surface cuts across a feature or a non-feature part,
  - (c) after applying the shift, smoothing the initial or interim surface when cutting across uncertain parts, such that smoothing and not shifting is applied to the uncertain parts, and
  - (d) reinforcing clear interpreted boundary parts by setting a shift to zero.

12. The method of claim 11, wherein defining the initial surface is based on an extrapolation from clear interpreted boundary parts and wherein the clear interpreted boundary parts used in the are kept fixed after the extrapolation.

13. The method of claim 11, wherein the separating of the volume attribute into feature, uncertain, and non-feature parts comprises applying thresholds on the volume attribute.

* * * * *